United States Patent
Suzuki et al.

(10) Patent No.: US 8,300,351 B2
(45) Date of Patent: Oct. 30, 2012

(54) MAGNETIC RECORDING APPARATUS

(75) Inventors: Hiroyuki Suzuki, Ome (JP); Hiroshi Kubota, Fussa (JP); Masahide Yatsu, Akishima (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/167,671

(22) Filed: Jun. 23, 2011

(65) Prior Publication Data
US 2011/0317308 A1  Dec. 29, 2011

(30) Foreign Application Priority Data
Jun. 24, 2010  (JP) ................................. 2010-144145

(51) Int. Cl.
*G11B 5/596* (2006.01)
*G11B 21/02* (2006.01)
*G11B 5/09* (2006.01)

(52) U.S. Cl. ............ 360/77.08; 360/75; 360/48; 360/29

(58) Field of Classification Search .......................... None
See application file for complete search history.

(56) References Cited

U.S. PATENT DOCUMENTS
6,873,482 B1 * 3/2005 Hsieh et al. .................... 360/48
2004/0051994 A1 * 3/2004 Akiyama et al. ........... 360/77.07

FOREIGN PATENT DOCUMENTS
| JP | 2006-31846 | 2/2006 |
| JP | 2007-95168 | 4/2007 |
| JP | 2009-245548 | 10/2009 |
| JP | 2010-108557 | 5/2010 |

* cited by examiner

*Primary Examiner* — Andrew L Sniezek
(74) *Attorney, Agent, or Firm* — Patterson & Sheridan, LLP

(57) ABSTRACT

According to one embodiment, a magnetic recording apparatus includes a magnetic recording medium for perpendicular magnetic recording system, a magnetic head including a read head to read data from the magnetic recording medium, and an actuator to actuate the magnetic head on the magnetic recording medium. The magnetic recording medium includes a first magnetic pattern recorded in a servo area by applying a magnetic field horizontally to a disk surface, and the first magnetic pattern corresponding to positioning data used for positioning the magnetic head. The magnetic recording medium further includes a second magnetic pattern recorded in the servo area by applying a magnetic field perpendicularly to the disk surface, and the second magnetic pattern corresponding to position correction data used for correcting the positioning data. The position correction data is derived from modulated original position correction data. The original position correction data is created for correcting the positioning data.

10 Claims, 7 Drawing Sheets

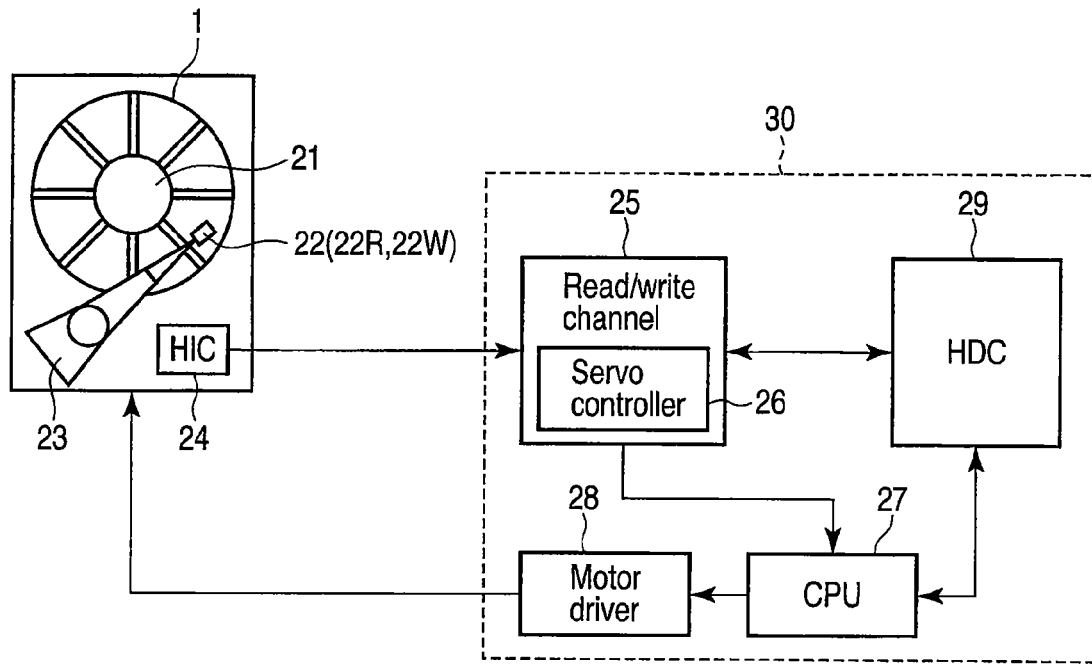
F I G. 12
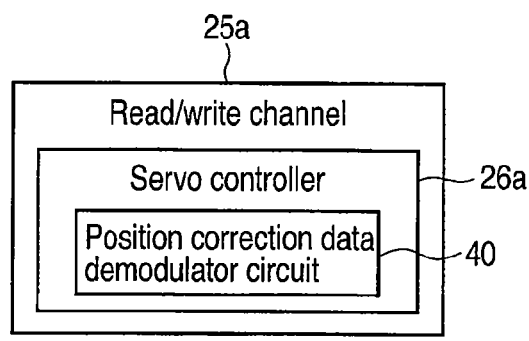
F I G. 13

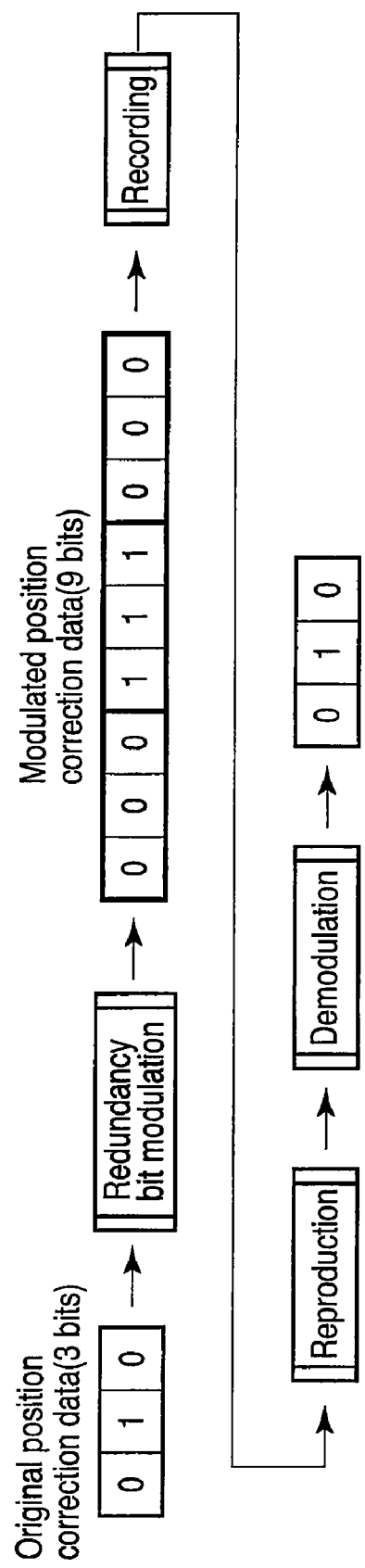
F I G. 16

MAGNETIC RECORDING APPARATUS

CROSS-REFERENCE TO RELATED APPLICATIONS

This application is based upon and claims the benefit of priority from Japanese Patent Application No. 2010-144145, filed Jun. 24, 2010; the entire contents of which are incorporated herein by reference.

FIELD

Embodiments described herein relate generally to a magnetic recording apparatus including a magnetic recording medium for perpendicular magnetic recording system.

BACKGROUND

The magnetic disk used for magnetic disk drive has been shifting from conventional horizontal (in-plane) magnetic recording system to perpendicular magnetic recording system for higher capacity.

At the same time, servo data recording is performed by using a device called as a servo track writer (STW). According to the recent high recording density, time required for recording servo data increases more and more, and hence the reduction of tact time is desired.

Then, instead of using the STW, using a magnetic transfer method has attracted interests, since it collectively records the servo data in a magnetic disk by using a master recording medium in which servo information is previously patterned.

The magnetic transfer system with respect to a perpendicular magnetic recording medium includes a perpendicular magnetic recording system which perpendicularly apply a magnetic field to a medium surface, and a horizontal magnetic recording system which horizontally apply a magnetic field to the medium surface. In general, the horizontal magnetic recording system has a preferable transfer characteristic with respect to a pattern miniaturization accompanied by high recording density compared with the perpendicular magnetic recording system.

At the same time, with high recording density of a magnetic disk drive, the requirement for track positioning accuracy of the head become severe year and year. As a technique for improving the track positioning accuracy of the head, a method including additionally recording positioning correction data in a servo area in which data is preliminarily recorded is given.

The waveform of reproduced data recorded by perpendicular magnetic recording system is rectangle same as the reproduced waveform of data recoded by magnetic head. Therefore, a compatibility of reproduced waveform between the data preliminarily recorded in the servo area by perpendicular magnetic recording system and the positioning correction data additionally recorded in the servo area by magnetic head is assured.

On the contrary, a reproduced waveform of data recorded by horizontal magnetic recording system is different from the reproduced waveform of data recorded by magnetic head. Horizontal magnetic recording system has an advantage over realizing higher recording density than perpendicular magnetic recording system. Therefore, the compatibility of reproduced waveform between the data preliminarily recorded in the servo area by horizontal magnetic recording system and the positioning correction data additionally recorded in the servo area by magnetic head is not assured.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 12 is an exemplary view schematically showing the magnetic disk drive according to the first embodiment.

FIG. 13 is an exemplary view showing a substantial part of a magnetic disk drive according to a second embodiment.

FIG. 16 is an exemplary view to explain a function of the magnetic disk drive according to the third embodiment.

DETAILED DESCRIPTION

Various embodiments will be described hereinafter with reference to the accompanying drawings.

In general, according to one embodiment, a magnetic recording apparatus includes a magnetic recording medium for perpendicular magnetic recording system, a magnetic head including a read head configured to read data from the magnetic recording medium and an actuator configured to actuate the magnetic head on the magnetic recording medium. The magnetic recording medium includes a first magnetic pattern recorded in a servo area by applying a magnetic field horizontally to a disk surface, and the first magnetic pattern corresponding to positioning data used for positioning the magnetic head. The magnetic recording medium further includes a second magnetic pattern recorded in the servo area by applying a magnetic field perpendicularly to the disk surface, and the second magnetic pattern corresponding to position correction data used for correcting the positioning data. The position correction data is derived from modulated original position correction data, the original position correction data is created for correcting the positioning data.

(First Embodiment)

Figure 1:
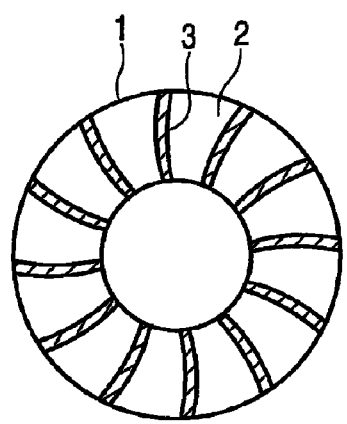
FIG. 1 is an exemplary view schematically showing a magnetic disk of perpendicular magnetic recording system according to a first embodiment.

FIG. 1 is a view schematically showing a magnetic disk (magnetic recoding medium) of perpendicular magnetic recording system according to a first embodiment.

A magnetic disk of the present embodiment includes a data area 2 and a servo area 3. The data area 2 is an area in which arbitrary user data is recorded by user. The servo area 3 is an area in which a servo pattern is recorded. The servo pattern comprises North and South Pole magnetic patterns.

In FIG. 1, there is shown a state that a plurality of arc-like servo areas 3, which extend from the rotational center of the magnetic disk 1 to a radius direction, is radially arranged. The shape and arrangement of the servo area 3 are not limited to FIG. 1.

Figure 2:
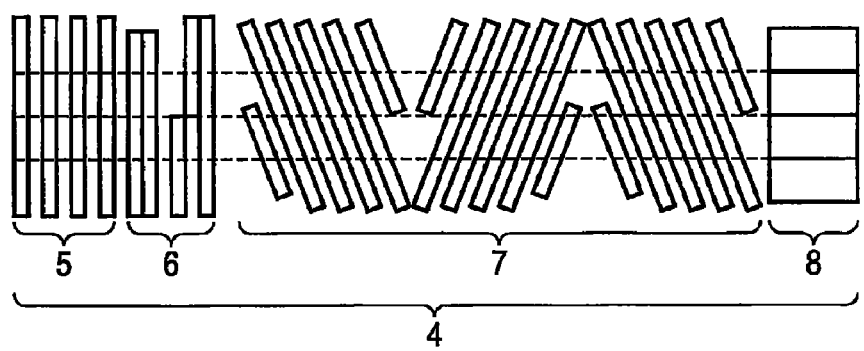
FIG. 2 is an exemplary view schematically showing an example of a servo pattern.

FIG. 2 schematically shows an example of a servo pattern.

A servo pattern 4 includes patterns (first magnetic patter) 5 to 7 and a pattern (second magnetic pattern) 8. The patterns 5 to 7 correspond to positioning data used for positioning a magnetic head. The pattern 8 corresponds to position correction data used for correcting the positioning data.

The pattern 5 includes a magnetic pattern corresponding to data related to a preamble and a servo mark. The pattern 6 includes a magnetic pattern corresponding to data related to an address. The pattern 7 includes a magnetic pattern corresponding to data related to a burst.

Hereinafter, a pattern corresponding to positioning data used for positioning a magnetic head is called as a positioning data pattern. Moreover, a pattern corresponding to position correction data used for correcting positioning data is called as a position correction data pattern.

Positioning data patterns 5 to 7 are recorded in a servo area in such a manner that a master disk is closely attached to a perpendicular magnetic recording medium, and a magnetic field is horizontally applied to the disk surface. The positioning data patterns 5 to 7 are reproduced by a suitable magnetic head (suitable channel setting). In this case, the read signal has a spike shape similar to an in-plane recording waveform as can be seen from FIG. 3.

The position correction data pattern 8 is recorded in a servo area using a magnetic head after positioning data patterns 5 to 7 are recorded. In this case, the magnetic head applies a magnetic field perpendicularly to the disk surface. When the position correction data pattern 8 is reproduced by suitable channel setting, the read signal has a rectangular waveform shown in FIG. 4.

Figure 3:
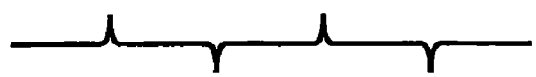
FIG. 3 is a waveform chart showing a read signal when a positioning data pattern is reproduced at suitable channel setting.
Figure 4:
FIG. 4 is an exemplary waveform chart showing a read signal when a position correction data pattern is reproduced at suitable channel setting.

From the signal waveforms shown in FIG. 3 and FIG. 4, it can be seen that suitable channel setting for demodulating data is different between positioning data patterns 5 to 7 and the position correction data pattern 8. In general, demodulation of positioning data patterns 5 to 7 is preferentially carried out. For this reason, the position correction data pattern 8 is to be read by using channel setting suitable for positioning data patterns 5 to 7.

Figure 5:
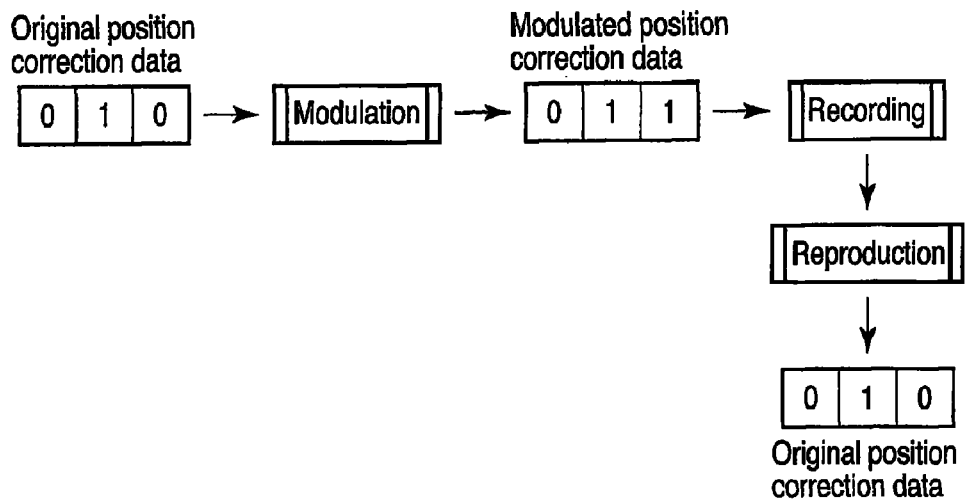
FIG. 5 is an exemplary view to explain position correction data (modulation position correction data) recorded in a magnetic disk of the first embodiment and modulated position correction data reproduced from the magnetic disk of the first embodiment.

FIG. 5 is a view to explain position correction data (modulation position correction data) recorded in a magnetic disk of the present embodiment and modulated position correction data reproduced from the magnetic disk of the present embodiment.

Figure 6:
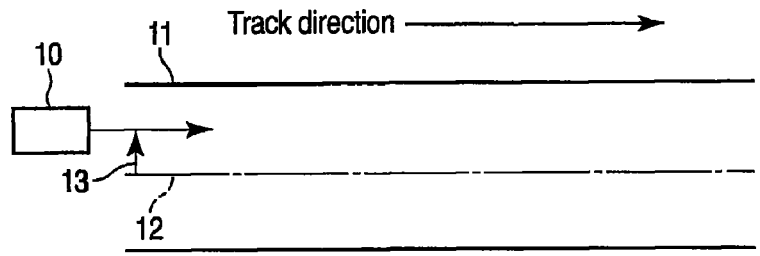
FIG. 6 is an exemplary view to explain a shift amount corrected by position correction data.

According to a well-known method (e.g., the specification of U.S. Pat. No. 6,608,731B2), position correction data is created. For example, as shown in FIG. 6, the position correction data (original position correction data) created by the method is data for correcting a shift amount 13 of a magnetic head 10 from the track center 12 at the time of tracing track 11 by the magnetic head 10.

Figure 7:
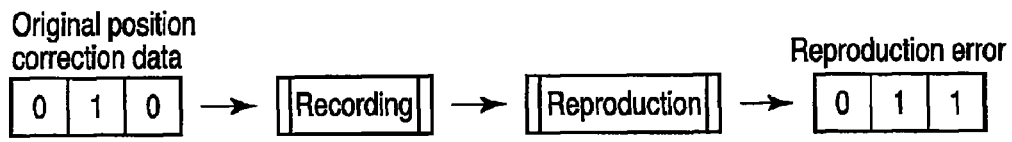
FIG. 7 is an exemplary view to explain position correction data (original position correction data) recorded in a magnetic disk of a comparative example and position correction data reproduced from the magnetic disk of the comparative example.

Here, if the original position correction data is recorded in the magnetic disk 1 as a magnetic pattern (hereinafter, referred to as an original position correction data pattern) and this recorded original position correction data pattern is read by cannel setting suitable for positioning data patterns 5 to 7 (comparative example), then the original position correction data pattern is reproduced in error (reproduction error) as shown in FIG. 7 for instance, since the channel setting data read characteristic is not suitable for the original position correction data pattern.

So, in the present embodiment, the original position correction data is modulated (corrected) such that the original position correction data is acquired even if the channel setting suitable for positioning data patterns 5 to 7 is used. Therefore, according to the present embodiment, it is possible to simply and accurately reproduce the data in the servo area (positioning data patterns 5 to 7, position correction data pattern 8) in which the data is to be reproduced by different waveform.

In the example of FIG. 5, the original position correction data after modulation (modulated position correction data) differs from the original position correction data by one bit. In the present embodiment, the modulated position correction data is recorded as a position correction data pattern 8 in the magnetic disk, and not the original position correction data.

The information required for modulation (modulation information) is previously acquired. For example, a comparison is carried out between the following reproduction signals to previously acquire the information. One is a reproduction signal (erroneous reproduction signal) of the original position correction data pattern read by channel setting suitable for positioning data patterns 5 to 7. The other is a reproduction signal (correct reproduction signal) of the original position correction data read by channel setting suitable for the position correction data pattern 8.

The modulation information is, for example, provided in a form of table in which the original position correction data before modulation (which is to be erroneously reproduced) is associated with the original position correction data after modulation (which is to be accurately reproduced). In the case of FIG. 5, "010" and "011" are associated, and then, registered in the table.

Another modulation will be described below with reference to FIG. 8.

In the example of FIG. 5, the number of bits of the original position correction data is the same before and after the modulation. But, in the example of FIG. 8, the number of bits of the original position correction data is different before and after the modulation. The number of bits is increased after the modulation.

Figure 8:
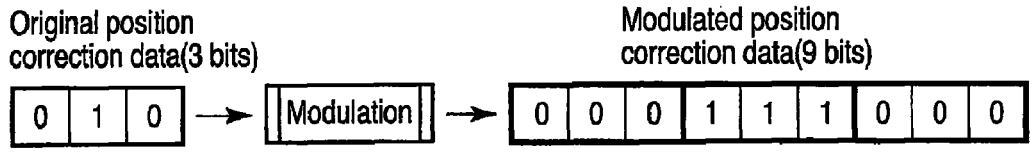
FIG. 8 is an exemplary view showing modulation position correction data with a redundancy bit according to the first embodiment.
Figure 9:
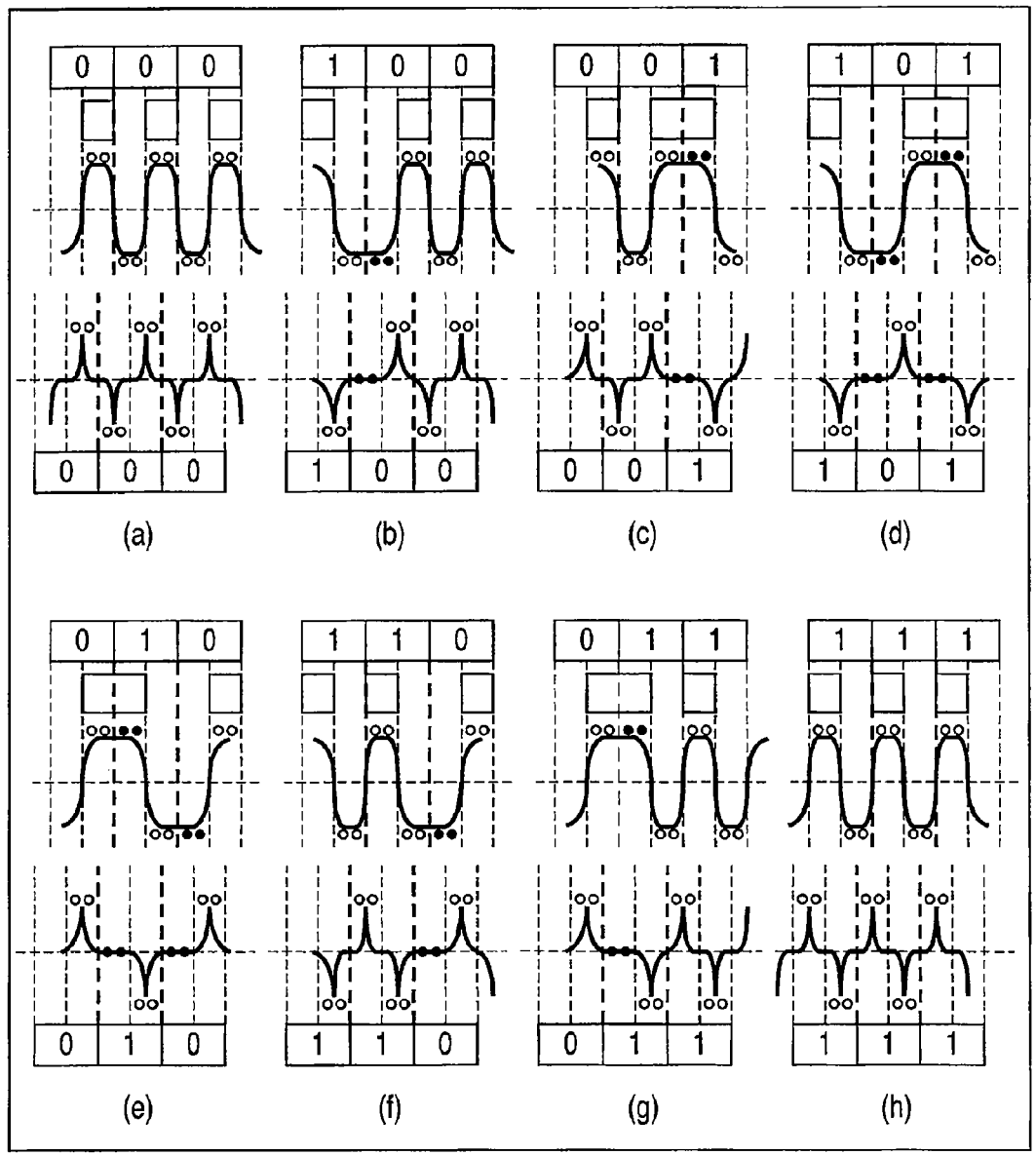
FIG. 9 is an exemplary view to explain an effect obtained by using modulation position correction data with the redundancy bit according to the first embodiment.

The modulation shown in FIG. 8 is generalized as follows. If the original position correction data is set to N-bit (N≧1) data, the position correction data is derived by adding 2N-bit data to the N-bit data such that both sides of each of digit of the N-bit data is added with bit data having same value as the digit. For example, the modulated position correction data corresponding to 3 bits, "010" (original position correction data) of FIG. 5 is expressed as 9 bits, "000111000" as shown in FIG. 8.

The effect of the modulation of FIG. 8 will be described below.

When 3 bits are given, there are eight kinds data of "000", "100", "001", "101", "010", "110", "011" and "111". These eight kinds of 3 bits data are recorded in the perpendicular magnetic recording medium by the magnetic head to create eight kinds of magnetic patterns corresponding to eight kinds of 3 bits data.

Investigation is made with respect to the following signal waveforms of eight kinds of magnetic patterns. One is a signal waveform (rectangular waveform) reproduced by channel setting suitable for the position correction data pattern. The other is a signal waveform (differential waveform) reproduced by channel setting suitable for the positioning data pattern. FIGS. 9A to 9H show the investigated result. In FIGS. 9A to 9H, a white circle ○ shows a point (sampling point) at which a modulated value (reproduced value) is the same on a rectangular waveform (upper-side waveform) and a differential waveform (lower-side waveform), and a black circle ● shows a point (sampling point) at which a modulated value (reproduced value) may be different on the rectangular waveform and the differential waveform (lower-side waveform).

From FIGS. 9A to 9H, in a case where the 3 bits data are "000" and "111", the center value (second digit value) and its both side values (first and third digit values) are the same in both of the rectangular and differential waveforms. Therefore, in a case where the original position correction data is "0", an occurrence risk of the reproduction error is sufficiently reduced by demodulating the modulated correction data "000" which is obtained by adding the same value (0) to both sides of "0", and employing its the center value (0) as the reproduction value. Likewise, when the original position correction data is "1", the reproduction error is sufficiently reduced by demodulating the modulated correction data "111" which is obtained by adding the same value (1) to both sides of "1", and employing its the center value (1) as the reproduction value.

From FIGS. 9A to 9H, it can be seen that the center values of the rectangular and differential waveforms are the same whereas the values of both sides of the center value are different when 3 bits data are "001" and "110". In this case, it is possible to prevent erroneous demodulation by using Vitabi decoding.

From FIGS. 9A to 9H, it can be seen that the center values of the rectangular and differential waveforms are different when 3 bits data are "100", "101", and "011". In this case, it is highly impossible to prevent erroneous demodulation even if Vitabi decoding is used.

From the above description, the 3N-bit modulated position correction data is said to have an advantageous data structure with low occurrence risk of the reproduction error, in which the 3N-bit modulated position correction data is obtained by the technique (both sides same value modulation) including providing 2N-bit data to the original position correction data of N-bit such that both sides of each of digit of the original position correction data is added with bit data having same value as the digit.

Figure 10A:
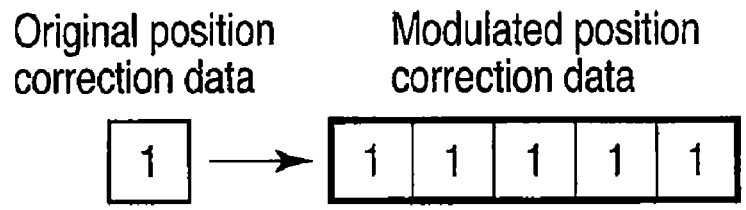
FIG. 10A and FIG. 10B are exemplary views to explain another modulation position correction data according to the first embodiment.
Figure 10B:
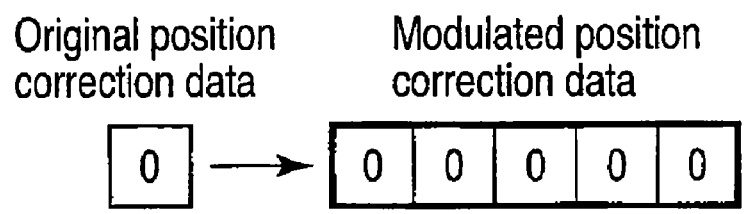

In the both sides same value modulation, one same bit value is added to each of both sides, but as shown in FIGS. 10A and 10B, two same bit values may be added to each of both sides for instance. Further, three same bit values or more may be added.

In addition, from FIGS. 9A to 9H, in the cases where 3 bits data are "001" and "110", the center value and one side value are correctly demodulated. Therefore, 2N-bit modulated position correction data is said to have an advantageous data structure with low occurrence risk of the reproduction error, in which the 2N-bit modulated position correction data is obtained by the technique (one side same bit modulation) including providing N-bit data to the original position correction data of N-bit such that left side of each of digit of the original position correction data is added with bit data having same value as the digit.

Figure 11A:
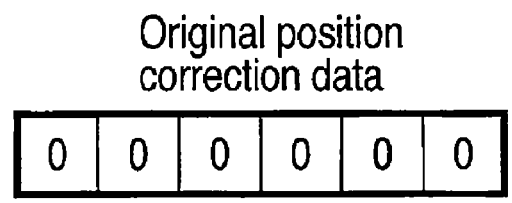
FIG. 11A and FIG. 11B are exemplary views to explain still another modulation position correction data according to the first embodiment.
Figure 11B:
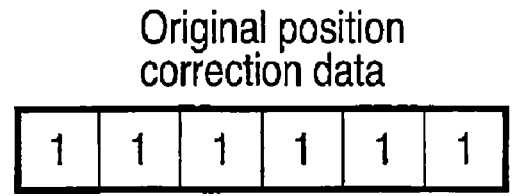

Furthermore, as shown in FIGS. 11A and 11B, in a case where the original position correction data has continuously the same values, a flag indicating the continuity of the same value is set, and thereby, it is possible to omit the same value bits (redundancy bits) added to both sides of each digit, resulting in data reduction. In FIGS. 11A and 11B, there are shown six bits original position correction data continuing the same values, however, the number of bits is not limited to six. For example, redundancy bits may be omitted with respect to three bit or more original position correction data continuing the same values.

The following method is provided as one method of preventing the reproduction error of position correction data. According to the method, although one magnetic head is used, channel setting is changed when positioning data patterns 5 to 7 are reproduced and when the position correction data pattern 8 is read. However, a problem relating read time is remained since changing the channel setting requires time.

The following method is another method of preventing the reproduction error of position correction data. According to the method, the position correction data pattern 8 is recorded in a data area. The position correction data pattern 8 and user data are reproducible by the same channel setting, therefore, it is possible to prevent a generation of reproduction error of the position correction data pattern 8. However, there is a need to remodel a currently using channel circuit so that the position correction data pattern 8 is recorded in the data area. This is a factor of causing a problem that much time is taken and the cost becomes high. Further, there is a need to find the position correction data pattern 8 from patterns recorded in the data area, and to selectively read it. For this reason, a problem arises in read time, too.

In contrast to the methods, according to the present embodiment, the position correction data pattern corresponding to the modulated position correction data is recorded in the servo area, hence it is possible to simply and accurately reproduce the servo data from servo patterns (magnetic patterns) recorded in the servo area.

For example, the present embodiment is applicable to a high recording density magnetic disk of perpendicular magnetic recording, which has a size of 2.5 inches and a capacity of 500 Giga or more. In such a high recording density magnetic disk, it is difficult in the current technique to simply and accurately reproduce the servo data (positioning data, position correction data) in which the servo data is to be reproduced by different waveforms (recorded by different manner).

FIG. 12 is a view schematically showing a magnetic disk drive (magnetic recording apparatus) according to the present embodiment.

The magnetic disk drive of the present embodiment comprises a magnetic disk 1, a spindle motor 21, a magnetic head 22, an actuator 23, a head amplifier (head IC) 24 and a printed circuit board (PCB) 30.

In the magnetic disk drive shown in FIG. 12, the magnetic disk 1 using modulation of employing no redundancy bit shown in FIG. 5 will be described below. The magnetic disk 1 using modulation of employing the redundancy bit shown in FIG. 8 will be described in the following third embodiment.

The magnetic disk 1 is rotated by a spindle motor 21 at high speed.

The magnetic head 22 includes a read head 22R and a write head 22W. The read head 22R reads a servo pattern from a servo area 3 formed on the magnetic disk 1 while reading user data on a user track. The write head 22W writes user data onto a data track of a data area.

An actuator 23 is driven by a voice coil motor (VCM), and then, controls the attached magnetic head 22 so that the head 22 is moved to the radius direction on the magnetic disk. The drive of the voice coil motor is controlled by a motor driver 28 mounted on a PCB 30. A head amplifier 24 amplifies a read signal (servo pattern and user data) read by the read head 22R, and then, outputs the read signal to a read/write channel (signal processing unit) 25 mounted on the PCB 30.

The PCB 30 is mounted with a read/write channel 25, a microprocessor unit (CPU) 27, a motor driver 28 and a hard disk controller (HDC) 29. The read/write channel 25 is a signal processing unit, which processes a read/write signals. The read/write channel 25 includes a servo controller 26, which reproduces servo data from the servo data output from the read head 22R.

The servo controller 26 outputs the reproduced servo data to the CPU 27. It is noted that the servo controller 26 generates position error data from a servo burst pattern of the reproduced servo data, and outputs the data to the CPU 27.

The CPU 27 is a main controller of the magnetic disk drive. The CPU 27 executes the positioning control of the magnetic head 22 based on the servo data including the positioning data and the position correction data according to the present embodiment.

The motor driver 28 includes a VCM driver and a SPM driver. The VCM driver supplies a driving current to the voice coil motor of the actuator 23 according to the control of the CPU 27. The SPM driver supplies a driving current to the spindle motor 21.

The HDC 29 is an interface, which executes a data transfer with an external host system. The HDC 29 transfers user data output from the read/write channel 25 to the host system based on the control of the CPU 27. Further, the HDC 29 receives data from the host system, and transfers it to the read/write channel 25.

According to the magnetic disk drive of the present embodiment, the servo pattern including the positioning data pattern and the position correction data pattern, which are recorded in the servo area of the magnetic disk, is read by the read head 22R.

The servo data including positioning data corresponding to the servo pattern and position correction data read by the read head 22R is reproduced by the read/write channel 25. At this time, the position correction data is accurately reproduced as described above. In addition, as the usually used hardware may be employed as the read/write channel 25, the complication of apparatus structure and the increasing of cost are prevented.

The reproduced servo data is output to the CPU 27. Then, the CPU 27 controls the drive of the actuator 23 based on the reproduced servo data including positioning data and position correction data to position the magnetic head 22 on a target data track which is a target position on the magnetic disk 1. At this time, the positioning data is accurately corrected based on the accurately reproduced position correction data. Therefore, the magnetic head 22 can be accurately positioned on the target data track.

(Second Embodiment)

FIG. 13 is a view showing a substantial part (read/write channel) of a magnetic disk drive (magnetic recording apparatus) according to a second embodiment.

The present embodiment differs from the first embodiment in tow points, that is, a magnetic disk and a read/write channel.

First, the magnetic disk will be described below.

The magnetic disk drive of the present embodiment includes a well-known magnetic disk, and not the magnetic disk of the first embodiment.

In the magnetic disk of the first embodiment, the position correction data pattern is the magnetic pattern corresponding to the position correction data derived from the modulated original position correction data. In the well-known magnetic disk, the position correction data pattern is the magnetic pattern corresponding to the original position correction data.

Next, the read/write channel will be described below.

The read/write channel 25a of the present embodiment includes a position correction data demodulator circuit 40 for demodulating erroneously read position correction data into correct data. The position correction data demodulator circuit 40 is provided in a servo controller 26a.

Figure 14:
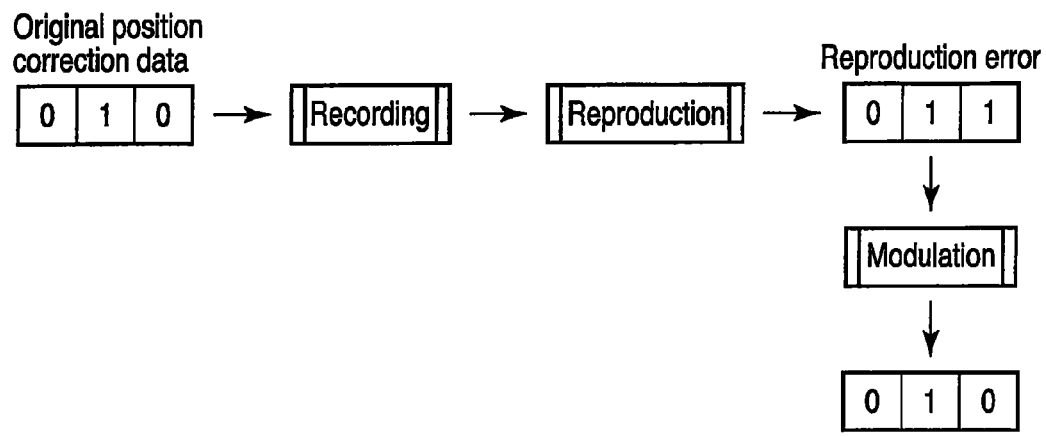
FIG. 14 is an exemplary view to explain a function of the magnetic disk drive according to the second embodiment.

The demodulation of the present embodiment will be described below with reference to FIG. 14.

According to a well-known method (e.g., the specification of U.S. Pat. No. 6,608,731B2), a position correction data (original position correction data) is created. This original position correction data is recorded in a servo area as a position correction data pattern using a magnetic head. When the position correction data pattern recorded in the servo area is read and reproduced by channel setting suitable for a positioning data pattern, data "011" different from the original position correction data "010" is acquired (reproduction error).

So, in the present embodiment, the position correction data demodulator circuit 40 demodulates (corrects) the erroneously reproduced original position correction data into correct data. A reproduced servo data including position correction data and demodulated position correction data is output to a CPU (not shown) (corresponding to the CPU 27 in FIG. 12). The CPU controls the drive of an actuator (not shown) (corresponding to the actuator 23 shown in FIG. 12) based on the servo data including position correction data and demodulated position correction data to position a magnetic head onto a target data track which is a target position on a magnetic, disk. At this time, as positioning data is accurately corrected based on the position correction data accurately reproduced by demodulation, the magnetic head can be controlled so that it is accurately positioned on the target data track.

The information required for modulation (modulation information) is previously acquired. For example, a comparison is carried out between the following reproduction signals to previously acquire the information. One is a reproduction signal (erroneous reproduction signal) of an original position correction data pattern read by a magnetic head (channel setting) suitable for a positioning data patterns. The other is a reproduction signal (correct reproduction signal) of an original position correction data read by a magnetic head (channel setting) suitable for the original position correction data pattern.

For example, the demodulation information is provided in a form of table like the case of modulation. In this case, the original position correction data (e.g., "010" in FIG. 14) is associated with an erroneous reproduction value of the corresponding original position correction data (e.g., "011" in FIG. 14).

As described above, even in case where the magnetic disk drive includes a well-known magnetic disk, by incorporating the position correction data demodulator circuit 40, it is possible to simply and accurately reproduce the data in the servo area (positioning data pattern, position correction data pattern) in which the data in the servo area is to be reproduced by different waveforms.

(Third Embodiment)

Figure 15:
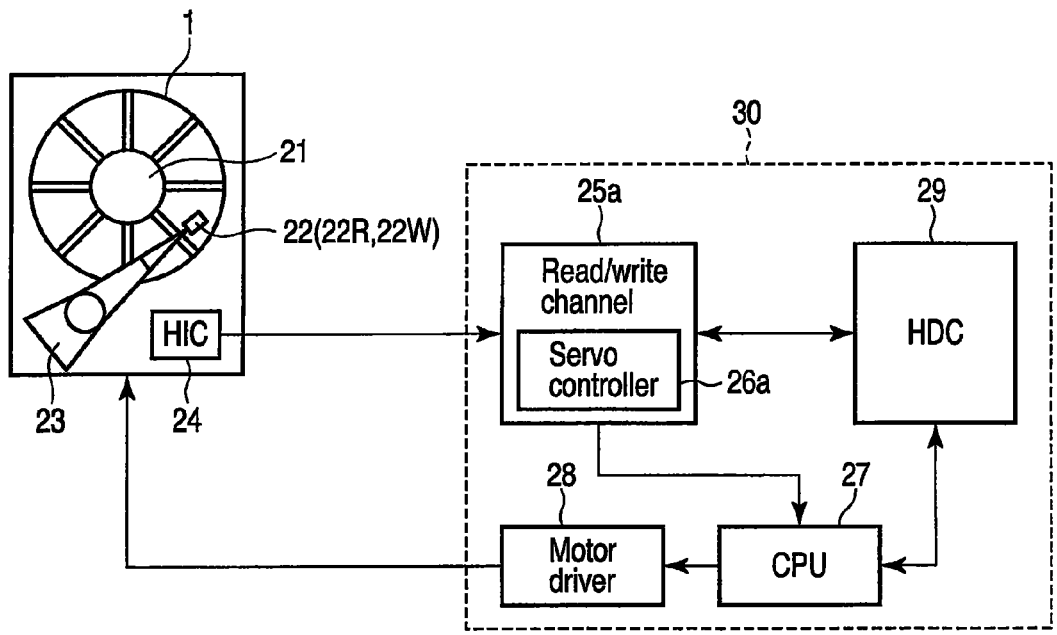
FIG. 15 is an exemplary view schematically showing a magnetic disk drive according to a third embodiment.

FIG. 15 is a view schematically showing a magnetic disk drive (magnetic recording apparatus) according to a third embodiment.

In the present embodiment, the magnetic disk 1 using modulation by the redundancy bit of the first embodiment and the read/write channel 25a of the second embodiment are used.

Here, as shown in FIG. 16, the case of using the both sides same bit modulation will be described. First, a position correction data (original position correction data) is created by well-known method, and modulated position correction data is obtained by applying the both sides same bit modulation to the created original position correction data. This modulated position correction data is recorded in a magnetic disk 1 as a position correction data pattern.

A servo pattern including the position correction data pattern recorded in the magnetic disk 1 is read by a magnetic head 22, and reproduced as servo data by a read/write channel 25a. The data corresponding to the modulated position correction data among the reproduced servo data, is demodulated by a position correction data demodulator circuit 40, and the original position correction data is acquired. In this case, the demodulation by the position correction data demodulator circuit 40 is carried out in manner that a second digit (center) bit (e.g., "0", "1", "0" in FIG. 16) is selected every 3 bits data (e.g., "000", "111", "000" in FIG. 16). It is noted that in case of one side same bit modulation, the first or second digit bit is selected every 2 bits data.

As described above, in the present embodiment, the magnetic disk 1 is employed as the first embodiment, it is possible to simply and accurately reproduce data in the servo area (positioning data pattern, position correction data pattern) in which the data in the servo area is to be reproduced by different waveforms.

In addition, as the magnetic disk 1 utilizes modulation by redundancy bits, it is possible to sufficiently reduce the occurrence risk of the reproduction error. Moreover, the magnetic disk 1 using modulation by redundancy bits is usable by a simple change of the apparatus, the complication of the apparatus configuration and the increasing of cost are suppressed, in which the simple change of the apparatus is using the read/write channel 25a including the servo controller 26a having the position correction data modulating function (position correction data modulator circuit).

The various modules of the systems described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A magnetic recording apparatus comprising:
    a magnetic recording medium for perpendicular magnetic recording system;
    a magnetic head comprising a read head configured to read data from the magnetic recording medium; and
    an actuator configured to actuate the magnetic head on the magnetic recording medium,
    wherein the magnetic recording medium comprises
    a first magnetic pattern recorded in a servo area by applying a magnetic field horizontally to a disk surface, and the first magnetic pattern corresponding to positioning data used for positioning the magnetic head; and
    a second magnetic pattern recorded in the servo area by applying a magnetic field perpendicularly to the disk surface, and the second magnetic pattern corresponding to position correction data used for correcting the positioning data, wherein the position correction data is derived from modulated original position correction data in which the original position correction data is created for correcting the positioning data.

2. The magnetic recording apparatus of claim 1, wherein the second magnetic pattern is derived by modulating the original position correction data such that position correction data is to be correct position correction data in which the position correction data is obtained by reading a magnetic pattern by the magnetic head wherein the magnetic pattern corresponds to the original position correction data.

3. The magnetic recording apparatus of claim 2, further comprises a head control module configured to position the magnetic head on the magnetic recording medium based on servo data which comprises the positioning data corresponding to the first magnetic pattern read by the magnetic head and the position correction data corresponding to the second magnetic pattern read by the magnetic head.

4. The magnetic recording apparatus of claim 1, wherein the original position correction data is N-bit (N≧1) data, the position correction data derived by modulating the original position correction data is 3N-bit data, the 3N-bit data is obtained by adding bit value to both sides of each of digit of the N-bit data in which the bit value has the same value as the digit.

5. The magnetic recording apparatus of claim 4, further comprises a head control module configured to position the magnetic head on the magnetic recording medium based on servo data which comprises the positioning data corresponding to the first magnetic pattern read by the magnetic head and the position correction data corresponding to the second magnetic pattern read by the magnetic head.

6. The magnetic recording apparatus of claim 1, wherein the original position correction data is N-bit (N≧1) data, the position correction data derived by modulating the original position correction data is 2N-bit data, the 2N-bit data is obtained by adding bit value to right or left side of each of the N-bit data in which the bit value has the same value as the digit.

7. The magnetic recording apparatus of claim 6, further comprises a head control module configured to position the magnetic head on the magnetic recording medium based on servo data which comprises the positioning data corresponding to the first magnetic pattern read by the magnetic head and the position correction data corresponding to the second magnetic pattern read by the magnetic head.

8. The magnetic recording apparatus of claim 1, further comprises a head control module configured to position the magnetic head on the magnetic recording medium based on servo data which comprises the positioning data corresponding to the first magnetic pattern read by the magnetic head and the position correction data corresponding to the second magnetic pattern read by the magnetic head.

9. A magnetic recording apparatus comprising:
- a magnetic recording medium for perpendicular magnetic recording system;
- a magnetic head comprising a read head configured to read data from the magnetic recording medium; and
- an actuator configured to actuate the magnetic head on the magnetic recording medium,
- wherein the magnetic recording medium comprises
- a first magnetic pattern recorded in a servo area by applying a magnetic field horizontally to a disk surface, and the first magnetic pattern corresponding to positioning data used for positioning the magnetic head;
- a second magnetic pattern recorded in the servo area by applying a magnetic field perpendicularly to the disk surface, and the second magnetic pattern corresponding to position correction data used for correcting the positioning data; and
- further comprises a demodulating module configured to demodulate position correction data into correct data, wherein the position correction data is obtained by reading by the magnetic head and the position correction data corresponds to the second magnetic pattern.

10. The magnetic recording apparatus of claim 6, further comprises a head control module configured to position the magnetic head on the magnetic recording medium based on servo data which comprises the positioning data corresponding to the first magnetic pattern read by the magnetic head and the position correction data corresponding to the second magnetic pattern read by the magnetic head.

* * * * *